Figure 1:
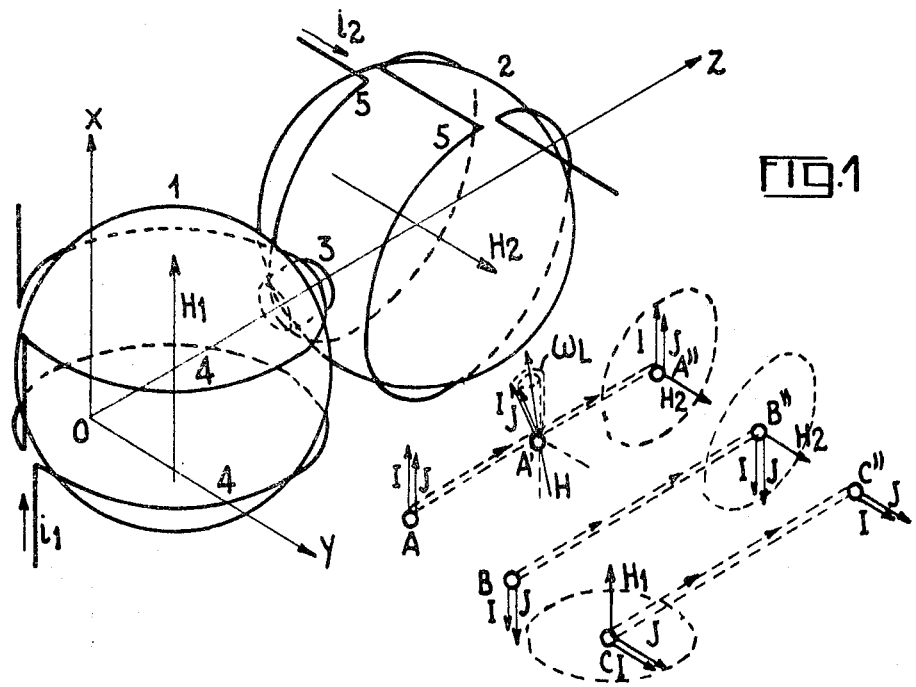

United States Patent

[11] 3,619,807

| [72] | Inventor | Henri Brun |
| | | Paris, France |
| [21] | Appl. No. | 21,859 |
| [22] | Filed | Mar. 23, 1970 |
| [45] | Patented | Nov. 9, 1971 |
| [73] | Assignee | Thomson-CSF |
| [32] | Priority | Mar. 24, 1969 |
| [33] | | France |
| [31] | | 6908549 |

[54] MASER OSCILLATOR HAVING TWO CONNECTED GAS CELLS WITH DIFFERENTLY ORIENTED MAGNETIC FIELDS
8 Claims, 5 Drawing Figs.

[52] U.S. Cl. .................................................. 331/94, 324/.5 R

[51] Int. Cl. ............................................... H01s 1/06
[50] Field of Search ........................................ 331/94, 3; 324/.5 R, .5 MA

[56] References Cited
UNITED STATES PATENTS

| 3,281,709 | 10/1966 | Dehmelt .................... | 331/94 X |
| 3,350,632 | 10/1967 | Robinson .................. | 331/94 X |

Primary Examiner—Roy Lake
Assistant Examiner—Siegfried H. Grimm
Attorney—Cushman, Darby & Cushman ABSTRACT: A maser oscillator comprises two cells, connected to each other through a duct, which are filled with atomic hydrogen and respectively subjected to crossed magnetic fields. One of the cells is lined internally with a film of a substance preventing atom misalignment and is located inside an UHF cavity.

MASER OSCILLATOR HAVING TWO CONNECTED GAS CELLS WITH DIFFERENTLY ORIENTED MAGNETIC FIELDS

The present invention relates to atomic oscillators of the MASER type comprising an ultrahigh frequency cavity into which atoms are fed in order that electrical oscillation within the cavity may be maintained by the electromagnetic energy quanta released by the atoms.

MASER oscillators, because they are based upon exploitation of the radiofrequency transitions of an atom, have an output signal whose frequency is remarkably stable. Such oscillators are currently used for atomic clocks which make it possible to define an extremely precise time scale; however, the degree of precision which can be attained depends upon the means used to produce the atomic transition required for the maintenance of the oscillations.

Atomic oscillations of known kind utilize beam separation techniques or optical pumping in order to group atoms inside the UHF cavity in proportions such that they can, when they relax, release sufficient electromagnetic energy to maintain oscillation.

The drawbacks of devices based on the beam separation are due to the need to produce, a jet of atoms and a very strong magnetic field, and this complicates the design of the oscillator and makes it relatively bulky.

The drawbacks of optically pumped systems are due to the necessity of isolating a given spectrum line for optical pumping purposes by means of a highly selective filter, and to the necessity of locating the atoms in a cell containing a buffer gas which has a disturbing effect upon the frequency stability of the system.

It is an object of the invention to avoid these drawbacks.

According to the invention, there is provided a maser oscillator comprising: a first and a second cell coupled to each other through a rectilinear duct and filled with atoms having in the ground state two hyperfine quantum levels F=0 and F=1, first inductor means for subjecting the atoms filling said first cell to a first magnetic field substantially perpendicular to the axis of said rectilinear duct, second inductor means for subjecting the atoms filling said second cell to a second magnetic field substantially perpendicular to said axis and at an angle with said first magnetic field, and a cavity resonator surrounding said second cell; said second cell being internally lined with a layer of a material preventing the misalignments of said atoms upon collision herewith.

Figure 2:
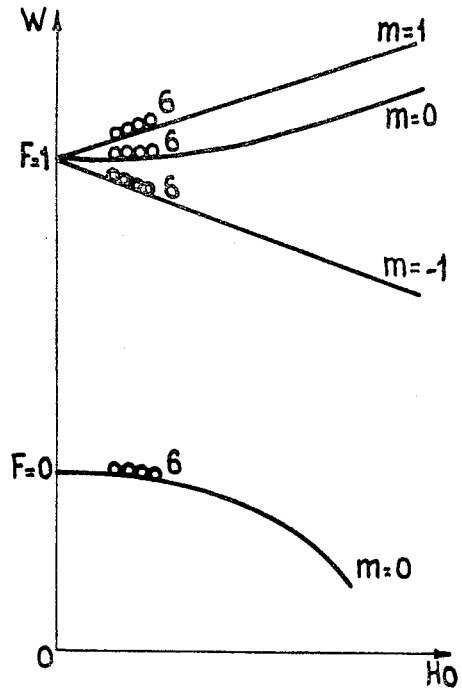
Figure 3:
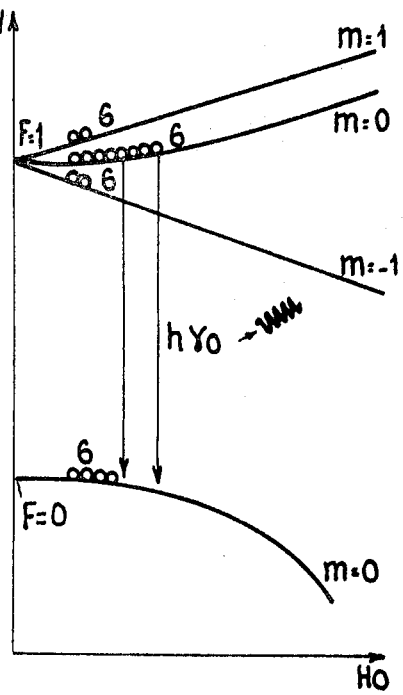
Figure 4:
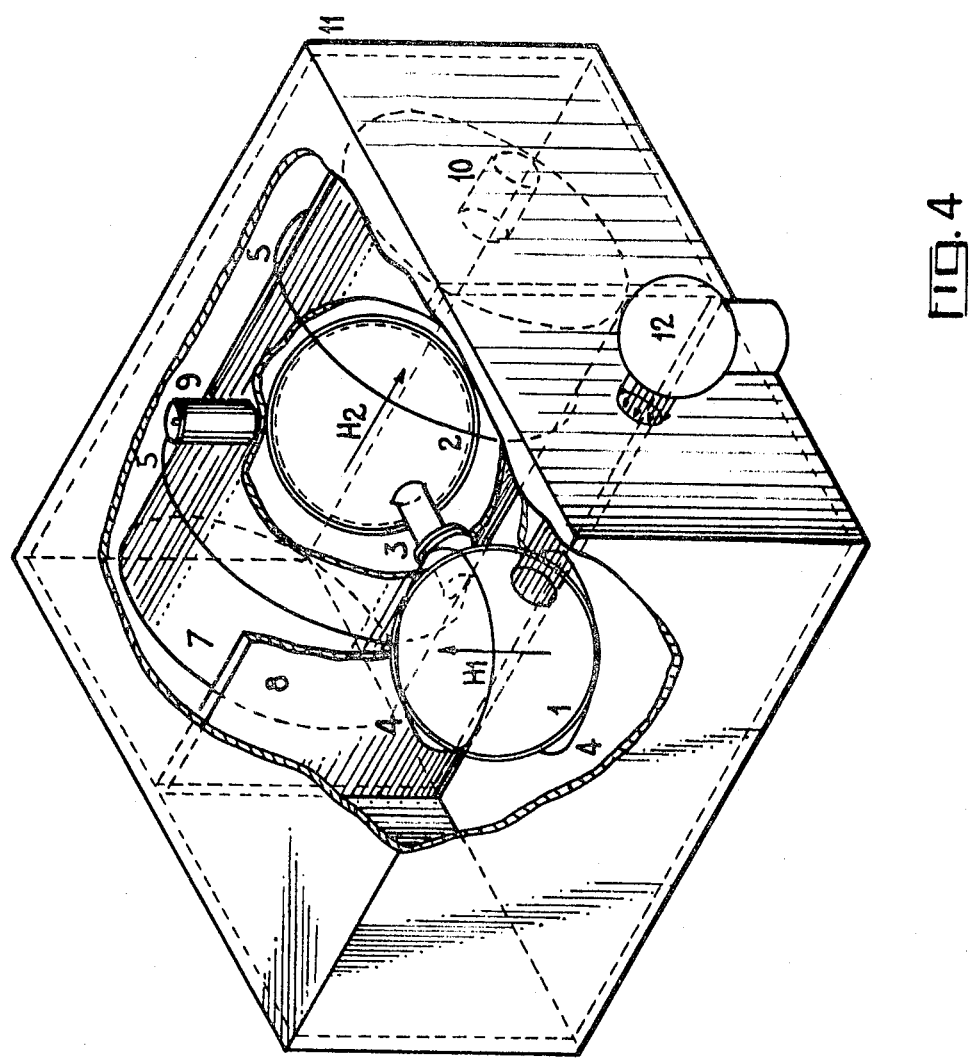
Figure 5:
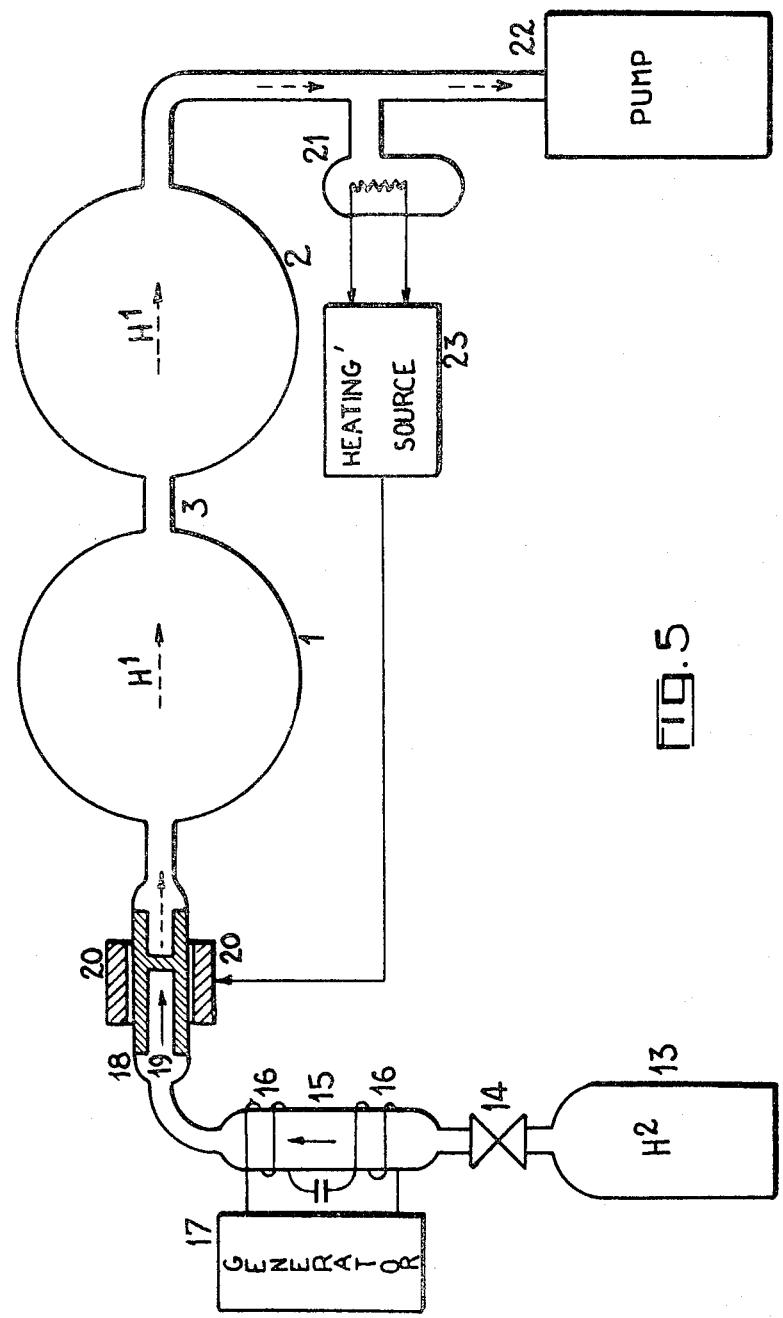

For a better understanding of the invention and to show how the same may be carried into effect, reference will be made to drawings accompanying the ensuing description and in which:

FIG. 1 schematically illustrates the principle of operation of the atomic oscillator in accordance with the invention;

FIGS. 2 and 3 are explanatory diagrams;

FIG. 4 provides an overall view of an atomic oscillator in accordance with the invention; and FIG. 5 shows diagrammatically a system for supplying atomic hydrogen to the device of FIG. 4.

In FIG. 1, there has been illustrated in relation to a system of axes OX OY and OZ, an arrangement comprising two cells 1 and 2 connected with one another by a tube 3.

The volume thus defined contains atoms whose ground state is made up of two hyperfine quantum levels F=0 and F=1. For example, this volume will be filled with atomic hydrogen at a pressure $p_H$ very much lower than atmospheric. Inductor coils 4 surround the cell 1, and, when supplied with a current $i_1$, create an internal magnetic field $\vec{H}_1$ orientated parallel to the axis OX; other inductor coils 5 surround the cell 2, and, when supplied with a current $i_2$, create another internal magnetic field $\vec{H}_2$, oriented parallel to the axis OY. The internal wall of the cell 2 is lined with a coating which opposes any misalignment of the atoms as a consequence of collision with the wall. Such a lining does not exist in the cell 1. If the cell 2 is surrounded by an UHF cavity (not shown in FIG. 1) then an atomic oscillator is obtained, the frequency $\nu_0$ of which is determined directly by the transitions $h.\nu_0$ undergone by the atoms in the cell 2; $h$ is the Planck constant.

The operation of the device shown in FIG. 1 requires neither optical pumping nor beam separation of the atoms in an atom "jet." It is based upon the fact that hydrogen atoms arriving from the cell 1 into the cell 2 through the duct 3 encounter therein a magnetic field having a different direction than in cell 1. This circulation of atoms takes place as a consequence of thermal agitation, at a mean velocity $\bar{v}$, in the order of 2,500 m./sec. at ambient temperature, and this velocity can be expressed by the well-known relationship:

$$\bar{v} = \sqrt{\frac{8kT}{\pi m}}$$

where $k$ is the Boltzmann constant, $T$ is the absolute temperature and $m$ the mass of the atom in question.

The hydrogen atom and other atoms, for example the thallium atom, have an electron spin function and a nuclear spin function which can be represented respectively by the vectors $\vec{I}$ and $\vec{J}$; this representation is illustrated in FIG. 1, where to the right of the cells 1 and 2 three atoms A, B and C of the cell 1 have been illustrated with their spins $\vec{I}$ and $\vec{J}$ having respectively the three possible orientations. The same atoms, once they passed into the cell 2, are marked A″, B″ and C″. At A′, the atom A is shown with its spins $\vec{I}$ and $\vec{J}$ at the instant at which it transits through the connecting tube 3.

In the cell 1, the atoms A, B and C exhibit in the presence of the field $\vec{H}_1$, energy levels which correspond respectively to three sublevels $m=1$, ti $m=0$, and $m=+1$ of the hyperfine structure level F=1 of the ground state. The atom A has its spins $\vec{I}$ and $\vec{J}$ parallel to the field $\vec{H}_1$ and is at the sublevel F=1, $m=1$; the atom C has its spins $\vec{I}$ and $\vec{J}$ parallel to the field $\vec{H}_1$ and is at the sublevel F=1, $m=0$; the atom B has field spins $\vec{I}$ and $\vec{J}$ parallel but opposed to the field $H_1$ and is at the sublevel F=1, $m=-1$.

The cell 1 contains the three groups of atoms A, B and C as well as a fourth group of atoms which occupy the hyperfine structure level F=0, $m=0$. Because of the law of equal distribution of energy and due to the absence of any internal lining on the wall of the cell 1, the groups of atoms contained in the cell 1 are formed by substantially the same numbers $n$ of atoms. FIG. 2 partially illustrates the energy level diagram $W=f(Ho)$ of the hydrogen atoms; at each of the different sublevels (F=0, $m=0$), (F=1, $m=-1$), (F=1, $m=0$) and (F=1, $m=+1$), there have been sketched the corresponding atomic populations 6. These are equal.

When the atoms A, B and C transit from the cell 1 into the cell 2, their energies are modified because, although the orientation of the systems $\vec{I}$ and $\vec{J}$ remains unchanged, that of the inductor field $\vec{H}_2$ is different. In the cell 2, the atom A, now marked A″, has its spins $\vec{I}$ and $\vec{J}$ perpendicular to $\vec{H}_2$. Accordingly it transits from the sublevel F=1, $m=+1$ to the sublevel F=1, $m=0$. The same applies to the atom B, marked B″, in the cell 2 which transits from the sublevel F=1, $m=-1$ to the sublevel F=1, $m=0$. The atom C, now marked C″, has in the cell 2 the orientation of its spins $\vec{I}$ and $\vec{J}$ parallel to or in an opposed parallel arrangement with, $\vec{H}_2$; the population $n$ of atoms C in the cell 1, in thus split in the cell 2 between the sublevels F=1, $m=-1$, and F=1, $m=+1$. The result of this flow of atoms from the cell 1 to the cell 2, is to increase the population of the level F=1, ti $m=0$ at the expense of the levels F=1, $m=+1$ and F=1, $m=-1$ whose populations are reduced; the spins $\vec{I}$ and $\vec{J}$ for the major part become aligned perpendicularly to $\vec{H}_2$ and this alignment tends to be retained because of the lining of the walls of the cell 2.

In FIG. 3, the energy level diagram $W=f(Ho)$ for hydrogen, shows the distribution of the atom populations 6 amongst their respective sublevels, after transfer of the atoms from the cell 1 into the cell 2; the sublevel F=1, $m=0$, has an excess of atoms in relation to the hyperfine structure level F=0, ti $m=0$. The excess of atoms thus developed due to transitions from the hyperfine level F=1, $m=0$ to the level F=0, $m=0$, will give rise to the emission of quanta $h.\nu_0$ of electromagnetic energy. These quanta supply the UHF cavity surrounding the cell 2 with the energy which it requires to maintain its oscillatory state. When the atoms have yielded up their quantum of energy in the cell 2, they return to the cell 1 where, as a consequence of thermal agitation and through the collisions which take place, they regain the energy quanta which allow them to return to their initial places in the sublevels.

The process of operation described hereinbefore, takes place uninterruptedly between the two cells. For it to be effective, however, it is necessary for the atoms to escape rapidly from the zone in which the magnetic field changes state, between the two cells.

Since the mean velocity $\bar{v}$ of the atoms is associated with the thermal agitation mechanism, it must be ensured that the angular velocity $\omega_L$ with which the spins $\vec{I}$ and $\vec{J}$ precess around the inductor fields, cannot substantially change the orientation of the latter during escape from the above zone; this condition is shown by the relationship:

$$\frac{2\pi}{\omega L} \gg \frac{l}{\bar{v}}$$

where $\omega L/2\pi$ is the Larmor frequency and $\pi$ is the thickness of the zone in which the magnetic field changes state.

To satisfy this condition, fields $\vec{H}_1$ and $\vec{H}_2$ having low strengths are used since $\omega$ is proportional to H. For example, for a field strength of 1 millioersted, the Larmor frequency is 1,400 cycles per second; the result is that the thickness $\omega$ should be substantially less than 180 cm. and this poses no problem.

Another condition which must be satisfied relates to the choice of the dimensions of the cell 2 and of the tube 3. Experience has shown that the maintenance of oscillations is the UHF cavity is not achieved unless the mean time of dwell $t_s$ of the atoms there is in the order of one second; this time of dwell depends upon the volume V of the cell 2, upon the cross-sectional area S of the tube 3 and upon a coefficient K which is a function of the length of the tube 3 and is equal to unity if said length is negligible. The time of dwell $t_s$ is easily calculated by considering the mechanism of flow of the particles contained in the cell 2; one finds that:

$$t_s = \frac{4V}{\bar{v} \cdot S \cdot K}$$

The volume V is made as large as possible, taking, however, into account the fact that cell 2 must be capable of being accommodated within the UHF cavity.

In the case of hydrogen, the tuning frequency $\nu_0$ of the cavity is equal to 1,420 MHz.; from this, one can calculate that a cylindrical cavity in which oscillation is in the $TE_{011}$ mode, can contain a cell 2 having a volume V in the order of 4,000 cm.³. By adopting a tube 3 of cylindrical form with a diameter of 3 mm. and short length, it will be seen that the dwell time $t_s$ given by the above formula is 0.9 seconds.

The choice of the pressure $p_H$ inside the cells 1 and 2 is determined by the fact that alignment of the atoms in the cell 2 must be maintained sufficiently long to enable the atoms to yield effectively their energy quanta to the cavity. With a pressure $p_H$ between $10^{16}$ and $10^{17}$ mm. Hg interatomic collisions are reasonably infrequent and the spectrum line of emission of the atom is prevented from exceeding the value $\Delta \nu = 1$ cycles per second determined by the condition of maintenance of oscillation.

In FIG. 4, an atomic oscillator in accordance with the invention can be seen. It comprises two cells 1 and 2, connected by a tube 3 and fitted respectively with inductor coils 4 and 5; the coil 4 creates in the cell 1 the magnetic field $\vec{H}_1$, whilst the coil 5 creates the magnetic field $\vec{H}_2$; a wall 8 forms a magnetic screen between the cells 1 and 2 so that the fields $\vec{H}_1$ and $\vec{H}_2$ retain their respective orientations in the cells 1 and 2. The cell 2 is surrounded by an UHF cavity 7 equipped with a coupler 9 and a tuning device 10. The assembly is located in an enclosure 11 forming a protective shield with respect to external sources of magnetic field. The cells 1 and 2 and the tube 3 form a closed environment filled with hydrogen at pressure $p_H$; the hydrogen is dissociated by means of an ultraviolet radiation source 12 irradiating the cell 1. The cell 2 is lined internally with a film of polytetrafluoroethylene in order to prevent any misalignment of the atoms within it by collision with the walls.

The atomic oscillator of FIG. 4 goes into oscillation, once the source 12 has been started, when the UHF cavity is tuned to the frequency $\nu_0$ corresponding to the hyperfine structure transition occuring in hydrogen between the levels F=0, m=0 and F=1, m=0. In order to promote the maintenance of the oscillations, the UHF cavity is orientated in such fashion in relation to the field $\vec{H}_2$ that the electromagnetic field it produces is parallel to $\vec{H}_2$ in the zone occupied by the cell 2. In FIG. 4, a cylindrical cavity operating in the $TE_{011}$ mode has been illustrated; the axis of the cylindrical cavity extends parallel to the field $\vec{H}_2$ created by the coils 5.

In FIG. 5, a device can be seen which enables appropriate filling of the cells 1 and 2 with atomic hydrogen to be effected. This device comprises the cells 1 and 2 and the tube 3, shown in FIG. 4, but the arrangement is not completely isolated. A supply tube is connected to the cell 1 and contains a valve 18, the other end of which is connected to an enclosure 15 where the dissociation of molecular hydrogen is carried out; the enclosure 15 is coupled by an expansion valve 14 to a bottle 13 of molecular hydrogen. An evacuation tube is connected to the cell 2 and to a vacuum gauge 21 in order to pump off the excess hydrogen by means of a pump 22. The valve 18 is equipped with a palladium valve element and electrical heating arrangement 20. The dissociation enclosure 15 is surrounded by an oscillatory circuit 16 connected to a high-frequency power source 17. The vacuum gauge 21 controls the heating source 23 connected to the heater element 20. The molecular hydrogen $H_2$ is supplied to the enclosure 15 at a pressure sufficient to enable it to be dissociated by high-frequency electrical discharge. This pressure is higher than the pressure $p_H$ of the hydrogen circulating in the cells 1 and 2 of the atomic oscillator. The valve element 19 limits the flow of atomic hydrogen because of palladium's property of being permeable in the hot condition to atomic hydrogen, the more so as its temperature rises. This property thus makes it possible by means of the device 23 to dose the quantity of hydrogen atoms in the cells 1 and 2 as a function of the pressure $p_H$ measured by the gauge 21. As the pressure $p_H$ tends to reduce, the palladium is heated so that it allows more atoms into the cells 1 and 2 than are removed by the pump 22. When the pressure $p_H$ tends to rise, the heating is interrupted in order to obtain the reverse effect.

Of course the invention is not limited to the embodiments described and shown which were given solely by way of example.

What is claimed is:

1. A maser oscillator comprising: a first and a second cell coupled to each other through a rectilinear duct and filled with atoms having in the ground state two hyperfine quantum levels F=0 and F=1, first inductor means for subjecting the atoms filling said first cell to a first magnetic field substantially perpendicular to the axis of said rectilinear duct, second inductor means for subjecting the atoms filling said second cell to a second magnetic field substantially perpendicular to said axis and at an angle with said first magnetic field, and a cavity resonator surrounding said second cell; said second cell being internally lined with a layer of a material preventing the misalignments of said atoms upon collision therewith.

2. A maser oscillator as claimed in claim 1, wherein said first and second magnetic fields are substantially perpendicular to each other.

3. A maser oscillator as claimed in claim 1, wherein said cavity resonator is a cylindrical cavity having its axis parallel to said second magnetic field.

4. A maser oscillator as claimed in claim 1, wherein said atoms are hydrogen atoms.

5. A maser oscillator as claimed in claim 4, wherein an ultraviolet radiation source illuminates at least a portion of the volume defined by said cells.

6. A maser oscillator as claimed in claim 4, wherein a source of atomic hydrogen is coupled to one of said cell, the other cell being coupled to a vacuum pump.

7. A maser oscillator as claimed in claim 6, wherein the flow of atomic hydrogen supplied by said source is monitored by a vacuum gauge.

8. A maser oscillator as claimed in claim 1, wherein a high permeability magnetic shield is provided around said cells and between them.

* * * * *